United States Patent
Hegerath

(10) Patent No.: US 6,929,107 B2
(45) Date of Patent: Aug. 16, 2005

(54) DUAL CLUTCH FOR A TRANSMISSION WITH TWO INPUT SHAFTS

(75) Inventor: Andreas Hegerath, Bergheim (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 09/971,815

(22) Filed: Oct. 5, 2001

(65) Prior Publication Data

US 2004/0206599 A1 Oct. 21, 2004

(30) Foreign Application Priority Data

Oct. 5, 2000 (EP) ............................................. 00121731

(51) Int. Cl.$^7$ ............................................. F16D 23/10
(52) U.S. Cl. ................................. 192/87.11; 192/106 F
(58) Field of Search .......................... 192/48.91, 87.11, 192/87.15, 85 AA, 106 F

(56) References Cited

U.S. PATENT DOCUMENTS

| | | | | |
|---|---|---|---|---|
| 2,687,198 A | * | 8/1954 | Greenlee ................ | 192/113.35 |
| 3,424,033 A | | 1/1969 | Croswhite | |
| 3,589,483 A | * | 6/1971 | Smith ......................... | 192/3.52 |
| 4,714,147 A | * | 12/1987 | Szodfridt et al. ......... | 192/87.15 |
| 4,741,422 A | * | 5/1988 | Fuehrer et al. ........... | 192/87.11 |
| 4,947,974 A | * | 8/1990 | Smemo et al. ............ | 192/85 AA |
| 5,711,409 A | * | 1/1998 | Murata ...................... | 192/87.11 |
| 5,865,289 A | * | 2/1999 | Ishimaru .................. | 192/87.11 |
| 6,543,597 B2 | * | 4/2003 | Tanikawa ................. | 192/87.11 |

FOREIGN PATENT DOCUMENTS

| | | | |
|---|---|---|---|
| DE | 3819702 | 12/1989 | |
| DE | 19833377 | 12/1999 | |
| EP | 0078116 A2 * | 5/1983 | ........... F16D/25/10 |
| EP | 0314636 | 5/1989 | |
| EP | 1052421 A1 * | 11/2000 | ........... F16D/25/10 |

* cited by examiner

*Primary Examiner*—Richard M. Lorence
(74) *Attorney, Agent, or Firm*—David B. Kelley

(57) ABSTRACT

The invention relates to a hydraulic twin clutch for a transmission with two transmission input shafts, preferably for a power-shift transmission in motor vehicles, with concentric arrangement of the two transmission input shafts, a driven clutch housing, two hydraulically actuated clutches with friction disks and annular piston-cylinder units, the first clutch connecting the clutch housing selectably to the first transmission input shaft and the second clutch connecting the clutch housing selectably to the second transmission input shaft. It is distinguished by the fact that the two clutches are arranged adjacent one another, separated by a clutch web firmly connected to the clutch housing, and the two piston-cylinder units provided for the actuation of the clutch are likewise arranged adjacent one another and separated by the clutch web, between the clutches and the transmission input shafts, on a smaller diameter than the clutches. The essential advantages are compact construction combined with high torque capacity and the possibility of achieving complete compensation of the centrifugal-force-dependent pressures in the working chambers through the provision of a compensating chamber.

14 Claims, 2 Drawing Sheets

DUAL CLUTCH FOR A TRANSMISSION WITH TWO INPUT SHAFTS

BACKGROUND OF THE INVENTION

The invention relates to a hydraulic twin clutch for a transmission with two transmission input shafts, preferably for a power-shift transmission in motor vehicles, with concentric arrangement of the two transmission input shafts, a driven clutch housing, two hydraulically actuated clutches with friction disks and annular piston-cylinder units, the first clutch connecting the clutch housing selectably to the first transmission input shaft and the second clutch connecting the clutch housing selectably to the second transmission input shaft.

DESCRIPTION OF THE PRIOR ART

DE 3819702 has disclosed a twin clutch of the generic type described in the preamble. The clutch housing is made up of a left-hand cover plate and side plate, a right-hand cover plate and side plate and a casing part that connects them. Annular pistons, which can be subjected to hydraulic pressure and actuate the two multi-disk assemblies by means of cylindrical pins resting against their ends, are fitted in at the dividing planes between the left-hand cover plate and the side plate and between the right-hand cover plate and the side plate. The axial arrangement of the annular pistons and the multi-disk assemblies means that the twin clutch as a whole has a very large axial overall length.

Another twin clutch of the generic type is disclosed by DE 19833377. It is distinguished by the fact that the annular pistons enclose a hollow space between them on their sides facing away from the first radial effective areas, that the annular pistons are provided with second radial effective areas on their sides facing the hollow space, these second radial effective areas being the same size, and that the hollow space is filled with a fluid. The clutch thus achieves the object according to the invention of avoiding the interfering effect of the centrifugal force exerted by the rotating hydraulic oil. However, the drive for the second clutch is very complex mechanically since a complicated linkage is required for force transmission from the annular piston to the multi-disk assembly.

SUMMARY OF THE INVENTION

It is therefore the object of the invention to provide a twin clutch of compact construction with a high torque capacity. There should furthermore be the possibility of achieving complete compensation in a simple manner of the centrifugal-force-dependent pressures in the working chambers of the piston-cylinder units.

The object is achieved by virtue of the fact that the two clutches are arranged adjacent one another, separated by a clutch web firmly connected to the clutch housing, and the two piston-cylinder units provided for the actuation of the clutch are likewise arranged adjacent one another and separated by the clutch web, between the clutches and the transmission input shafts, on a smaller diameter than the clutches.

By means of this arrangement, compact construction is achieved in combination with a high torque capacity. The external dimensions of the twin clutch are determined essentially by the friction disks, the outside diameter by the outside diameter of the friction disks plus the friction-disk carriers, and the overall length by twice the thickness of the friction-disk assembly plus the pressure plates. There is sufficient installation space for the piston-cylinder units between the inside diameter of the friction disks and the transmission input shafts to ensure reliable operation of the clutch.

A twin clutch of this kind has the maximum possible torque capacity for given outside dimensions and allows the most compact construction for a required torque capacity: the friction disks are arranged as far out as possible radially, thereby ensuring the maximum torque per friction disk in relation to the outside diameter of the twin clutch, and the total overall length is fully taken up by the two friction-disk assemblies including the required contact-pressure plates, thereby ensuring that the maximum number of friction disks is accommodated for a given overall length of the twin clutch.

The clutch web and the clutch housing are advantageously connected by a clutch hub and a clutch cover of the clutch housing by arranging the clutch cover and the clutch web in a fixed manner on the clutch hub. The clutch hub is mounted on a clutch shaft that is firmly connected to the transmission housing and has a plurality of oil passages, via which the clutch hub is supplied with pressurized oil for the actuation of the clutch. The clutch hub thus has three functions: rotatable support for the entire driving part of the twin clutch relative to the transmission housing, power transmission from the clutch housing to the clutch web, and supplying oil to the piston-cylinder units.

The first transmission input shaft is advantageously connected to the first clutch via a first clutch bell by virtue of the fact that the first clutch bell is fixed on the first, hollow transmission input shaft and accommodates the output-side friction disks of the first clutch on the inside diameter of the outer flange. The second transmission input shaft is furthermore connected to the second clutch via a second clutch bell by virtue of the fact that the second clutch bell is fixed on the second, inner transmission input shaft and accommodates the output-side friction disks of the second clutch on the inside diameter of the outer flange.

This arrangement requires only a minimum of additional installation space in order to transmit torque from the clutch housing on the engine side to the two transmission input shafts of the transmission further down the drive line.

The clutch web between the two clutches is preferably the input-side pressure plate for both clutches. This eliminates one pressure plate; its function is assumed by the single central clutch web.

The input-side friction disks of both clutches are connected in a rotationally fixed manner at their inside diameters to inner friction-disk carriers arranged on the clutch web. As a result, the clutch web and the two inner friction-disk carriers can be produced in one piece, saving installation space and reducing weight and production costs.

The two clutches and the two piston-cylinder units are furthermore advantageously identical and are each arranged in mirror symmetry with respect to the clutch web. Using identical piston-cylinder units and identical friction disks reduces the complexity of the twin clutch, resulting in a considerable advantage in terms of cost.

In another advantageous refinement of the invention, a piston-cylinder unit has an annular piston and an annular cylinder, which form a working chamber that can be supplied with pressurized oil, the annular piston being movably guided and sealed in the annular cylinder, the annular cylinder being connected firmly to the clutch hub, the annular piston being arranged between the clutch web and the annular cylinder, and the annular piston acting on the movable input-side pressure plate of the friction disks via a contact-pressure ring.

When the working chamber is supplied with pressurized oil, the annular piston is displaced in the direction of the clutch web. This applies to both annular pistons, i.e. the two annular pistons press in opposite directions. Arranging the clutch hub on the clutch shaft makes it a very simple matter to supply the working chambers with pressurized oil.

In an advantageous embodiment, the contact-pressure ring surrounds the annular cylinder radially and is sealed off radially relative to the annular cylinder by means of a circumferential seal in a manner that allows movement, and a compensating cover is arranged on the contact-pressure ring on the opposite side of the annular cylinder from the annular piston, the compensating cover, the contact-pressure ring and the annular cylinder forming a compensating chamber for compensating the pressure in the working chamber due to the centrifugal forces.

When the clutch hub rotates, the compensating chamber is continuously filled with oil. Owing to the centrifugal forces, the oil is held in the compensating chamber, the compensating chamber being filled as far as the inside diameter of the compensating cover. Excess oil escapes there and is available to the lubricating circuit again. In relation to the annular cylinder, the compensating chamber is arranged opposite the working chamber. If a pressure builds up at high speeds of the clutch hub owing to the centrifugal forces, the resulting force on the compensating cover of the compensating chamber counteracts the force on the annular piston resulting from the pressure of the oil in the working chamber due to the centrifugal forces. Thanks to the advantageous arrangement of the compensating chamber opposite the working chamber, the two forces act directly against one another and thus cancel each other out without further measures. By adapting the inside and outside diameters of the compensating cover, which determine the effective pressure area of the compensating chamber, it is possible to completely eliminate the forces on the annular piston resulting from the pressures of the oil due to the centrifugal forces. As a result also, the return device for the annular piston can be made as small as possible.

In a further embodiment, the contact-pressure ring surrounds the annular cylinder radially, and a compensating cover is arranged on the contact-pressure ring on the opposite side of the annular cylinder from the annular piston, the compensating cover, the contact-pressure ring and the annular piston forming a compensating chamber for compensating the pressure in the working chamber due to the centrifugal forces. This arrangement differs from the embodiment discussed above only in that an additional radial seal is omitted and, as a result, the compensating chamber directly adjoins the working chamber, being separated from it by a sealing ring.

The compensating chamber is advantageously filled with pressurized oil from the working chamber via one or more filling holes of small diameter. This is a simple means of ensuring the oil supply to the compensating chamber, with the result that as soon as there is oil in the working chamber, there is oil in the compensating chamber.

In another embodiment of the oil supply, the compensating chamber is filled with pressurized oil via a separate supply, independently of the pressure in the working chamber. This makes it possible to keep the quantity of oil lost very small since only a very low oil pressure and a small quantity of oil are needed to supply the compensating chamber.

DESCRIPTION OF THE DRAWINGS

Further advantageous refinements of the invention can be found in the following drawings, in which.

DESCRIPTION OF THE PREFERRED EMBODIMENTS

Figure 1:
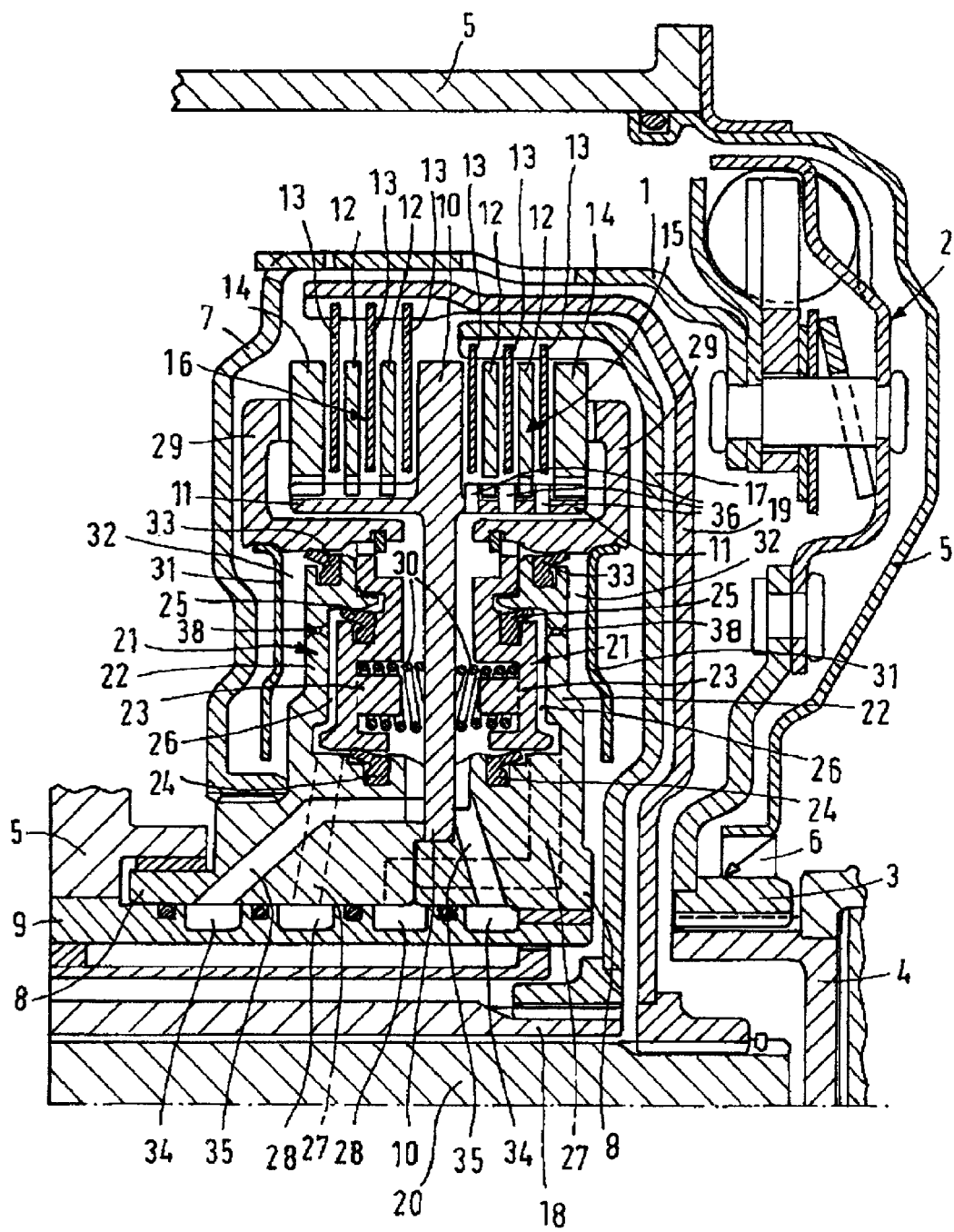
FIG. 1 shows a twin clutch according to the invention.

The twin clutch shown in FIG. 1 has the clutch housing 1, which is connected in a rotationally fixed manner to the drive shaft 4 of an engine (not shown) at the clutch flange 3 by means of the torsional damper unit 2. A shaft sealing ring 6 is arranged between the clutch flange 4 and the transmission housing 5. On the side facing away from the engine, the twin clutch has a clutch-housing cover 7, which connects the clutch housing 1 to the clutch hub 8 in a rotationally fixed manner, the clutch hub 8 being divided into two for reasons connected with assembly.

The clutch hub 8 is arranged rotatably on the clutch shaft 9 firmly connected to the transmission housing. The purpose of the clutch shaft 9, apart from providing rotary support for the clutch hub 8 and hence for the entire twin clutch, is furthermore to supply oil to the twin clutch, this taking place via the fixed connection between the clutch shaft 9 and the transmission housing 5.

The clutch web 10 firmly connected to the clutch hub 8 is arranged between the two parts of the clutch hub 8. This web has the two inner friction-disk carriers 11, which extend in the axial direction on both sides of the clutch web 10. The input-side friction disks 12 are arranged in a rotationally fixed and axially displaceable manner on the inner friction-disk carriers 11. The input-side friction disks 12 engage in the output-side friction disks 13. Arranged at the axial end of each friction-disk assembly are the input-side pressure plates 14, via which an axial coupling pressure is applied to the first friction-disk assembly 15 or the second friction-disk assembly 16, thereby closing the clutch. The clutch web 10 acts as a counterpressure plate for both friction-disk assemblies, with the result that there need only be one counterpressure plate.

The output-side friction disks 13 of the first friction-disk assembly 15 are connected in a rotationally fixed and axially displaceable manner to the first clutch bell 17 and the latter, in turn, is connected in a rotationally fixed manner to the first transmission input shaft 18. If the first friction-disk assembly 15 is subjected to the coupling pressure via the pressure plate 14, the friction-disk assembly 15 establishes a rotationally fixed connection between the inner friction-disk carrier 11 and the first clutch bell 17, with the result that the driving torque from the drive shaft 4 is passed to the first transmission input shaft 18.

The second friction-disk assembly 16 acts in the same way: the output-side friction disks 13 of the second friction-disk assembly 16 are connected in a rotationally fixed and axially displaceable manner to the second clutch bell 19 and the latter, in turn, is connected in a rotationally fixed manner to the second transmission input shaft 20. If the second friction-disk assembly 16 is subjected to the coupling pressure via the pressure plate 14, the friction-disk assembly 16 establishes a rotationally fixed connection between the inner friction-disk carrier 11 and the second clutch bell 19, as a result of which the driving torque is passed from the drive shaft 4 to the second transmission input shaft 20.

The coupling pressure on the two pressure plates 14 is applied by means of two piston-cylinder units 21, which are arranged between the inner friction-disk carriers 11 and the clutch hub 8. Both piston-cylinder units 21 are identical and preferably have the same components, for which reason also the same reference numerals are used for identical components in the drawings. The piston-cylinder units 21 are arranged in mirror symmetry relative to the clutch web 10 so that each of them can apply the coupling pressure in the direction of the clutch web 10.

Each piston-cylinder unit has an annular cylinder 22, which is firmly connected to the clutch hub 8. An annular piston 23 is arranged on the annular cylinder 22. The working chamber 26 is formed between the annular cylinder 22 and the annular piston 23 by means of the ring seals 24 and 25. The working chamber 26 is connected to the oil passage 28 in the clutch shaft 9 by the oil hole 27 in the clutch hub 8. The oil in the oil passage 9 is subjected to a control pressure by means of a control system (not shown), the control pressure propagating to the working chamber 26 via the oil hole 27. The control pressure in the working chamber 26 causes the annular piston 23 to extend, generating the coupling pressure. The coupling pressure is transmitted to the pressure plate 14 via the contact-pressure ring 29 firmly connected to the annular piston 23 and the clutch closes.

If the control pressure is reduced, the coupling pressure decreases, the clutch opens and the annular piston 23 returns to its rest position, the compression spring 30 assisting its return. Since there is always a residual quantity of oil in the working chamber 26, there is always an additional rotational-speed-dependent pressure acting in the working chamber 26 due to the centrifugal forces. This pressure due to the centrifugal forces produces a force on the annular piston 23, a force that must be continuously counteracted by the compression spring 30 since otherwise the annular piston 23 will move out of its rest position and the pressure plates 14 and hence the friction-disk assemblies 15, 16 will be subject to a slight coupling pressure that will lead to unwanted torque transmission by the respective clutch when an annular piston 23 should in fact be in the rest position. Since, at high rotational speeds, only one clutch is generally closed, this pressure due to the centrifugal forces would engage the second clutch unnecessarily, which would lead to torque losses and unnecessary wear.

According to the invention, this pressure in the working chamber due to the centrifugal forces is compensated for by forming a compensating chamber 32 between the annular cylinder 22 and a compensating cover 31 attached to the contact-pressure ring 29, this chamber being sealed by means of the ring seal 33 between the contact-pressure ring 29 and the annular cylinder 22. Radially on the inside, the compensating chamber 32 is open, i.e. at least some of the oil in the compensating chamber 32 flows out of it when the clutch is stationary. Only when the clutch is rotating does the oil remain in the compensating chamber 32 owing to the centrifugal forces.

The compensating chamber 32 is filled via a small filling hole 38 in the annular cylinder 22, said hole connecting the working chamber 26 and the compensating chamber 32. This ensures that as soon as the working chamber 26 is filled with oil, the compensating chamber 32 is also filled with oil. The effective pressure area of the compensating chamber 32 and hence the counterforce, dependent on the centrifugal forces, counteracting the force produced by the pressure in the annular piston 23 due to the centrifugal forces is defined by adapting the external and internal radius of the compensating cover 31. This arrangement allows any desired relationship between the forces, dependent on the centrifugal forces, that prevail in the working chamber 26 and the compensating chamber 32, it being possible to take account not only of special features of the design such as the height of the column of liquid in the oil holes 27, which affects the pressure due to the centrifugal forces, but also of certain rotational-speed-dependent characteristics in the return of the annular piston 23 to the rest position. One significant advantage is that the strength of the compression spring 30 need only be sufficient to move the annular piston into the rest position in the stationary condition. This eliminates the high control pressure required for the working chamber 26 in the case where the compression spring 30 has a relatively high spring force and, as a result, the oil requirement for the clutch is lower overall.

To supply the friction disks 12, 13 with oil, the clutch shaft 9 has further oil passages 34, which pass oil via oil holes 35 into the region radially to the inside of the inner friction-disk carriers 11. This oil is passed to the friction disks 12, 13 via lubrication openings 36 formed in the inner friction-disk carrier 11 and thus cools and lubricates them.

Figure 2:
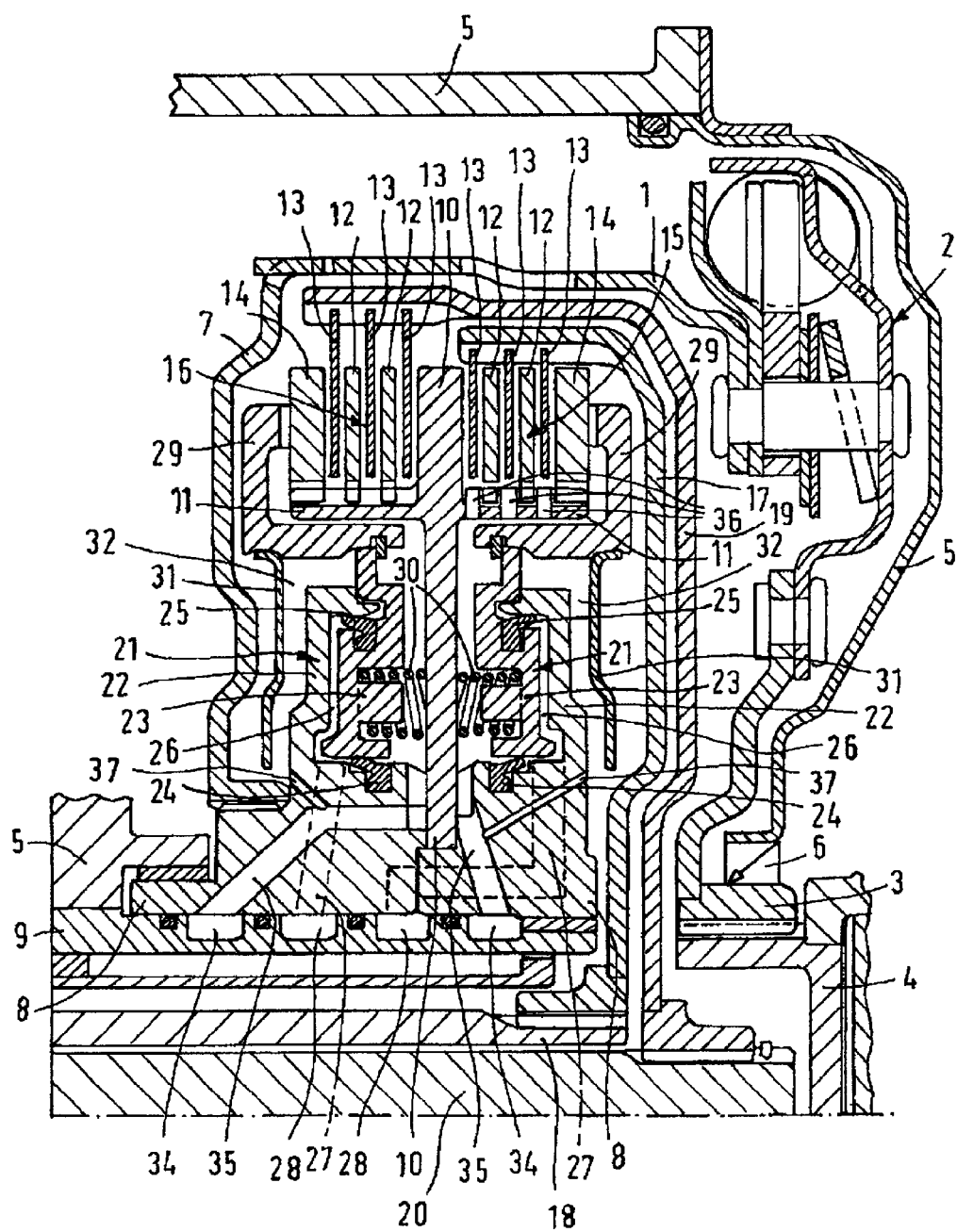
FIG. 2 shows another arrangement of the piston-cylinder unit.

Another embodiment of the piston-cylinder unit is illustrated in FIG. 2. The most important difference with respect to the embodiment shown in FIG. 1 consists in the arrangement of the system for filling the compensating chamber and for sealing it.

The compensating chambers 32 are filled from the oil passages 34 via the oil supply system for the friction-disk assemblies 15, 16 by connecting additional filling holes 37 to the oil holes 35. Via these filling holes 37, lubricating oil at low pressure enters the compensating chambers 32. There is no direct connection here between the compensating chamber 32 and the working chamber 26. The essential advantage is that the control pressure in the working chamber can be matched more closely to the required coupling pressure of the annular piston 23 since now less control oil is lost In this embodiment, there is furthermore no ring seal between the contact-pressure ring 29 and the annular cylinder 22. Although the compensating chamber 32 now extends as far as the annular piston 23 of the working chamber 26, the compensation of the centrifugal forces can be set as desired by adapting the inside diameter of the compensating cover 31.

The present invention thus discloses a twin clutch which, while being of compact construction, has a high torque capacity and allows complete compensation of the pressure in the clutch operating system due to the centrifugal forces. It is self-evident that the applications of the invention are not limited to the examples illustrated. In particular, component solutions in this twin clutch can also be employed in other embodiments.

What is claimed is:

1. A Hydraulic twin clutch for a transmission having two transmission input shafts, comprising:
   first and second transmission input shafts;
   a driven clutch housing;
   a first clutch for releasably connecting the clutch housing to the first transmission input shaft, having first friction discs;
   a first annular piston-cylinder unit, located radially outward of the first transmission shaft and radially inward from the first friction discs for hydraulically-actuating the first clutch;
   a second clutch for releasably connecting the clutch housing to the second transmission input shaft, having second friction discs;
   a second annular piston-cylinder unit located adjacent the first piston-cylinder unit, located adjacent the first friction discs, located radially outward of the second transmission shaft and radially inward from the second friction discs, for hydraulically-actuating the second clutch;

a clutch web fixed to the clutch housing, located between the first and second clutches and between the first and second piston-cylinder units.

2. The hydraulic twin clutch as claimed in claim 1, further comprising:

A clutch cover driveably connected to the clutch housing; and

A clutch hub to which the clutch web and clutch housing are driveably connected.

3. The hydraulic twin clutch of claim 1, further comprising:

A first clutch bell driveably connecting the first transmission input shaft and first clutch, Having a radially inner surface drieveably engaged with friction discs of the first clutch; and A second clutch bell driveably connecting the second transmission input shaft and second clutch, having a radially inner surface driveably engaged with friction discs of the second clutch.

4. The hydraulic twin clutch as claimed in claim 1, further comprising:

A first pressure plate for the first clutch and a second pressure plate for the second clutch, each pressure plate formed integrally with the clutch web.

5. The hydraulic twin clutch as claimed in claim 1, wherein

The first clutch further comprises a first set of input friction discs, a first disc carrier supporting the first set of input friction discs and formed integrally on the clutch web; and The second clutch further comprises a second set of input friction discs, a second disc carrier supporting the second set of input friction discs and formed integrally on the clutch web.

6. The hydraulic twin clutch as claimed in claim 2, wherein the first clutch further comprises a third pressure plate located at the opposite axial side of the first discs from the location of the first pressure plate, the second clutch further comprises a fourth pressure plate located at the opposite axial side of the second discs from the location of the second pressure plates; further comprising:

a first annular cylinder forming a working chamber supplied with pressurized oil, driveably connected to the clutch hub;

a second annular cylinder forming a working chamber supplied with pressurized oil, driveably connected the clutch hub;

a first annular piston movably guided and sealed in the first annular cylinder, arranged between the clutch web and first cylinder, and adapted to apply force on the third pressure plate; and a second annular piston movably guided and sealed in the second annular cylinder, arranged between the clutch web and the second cylinder, and adapted to apply force on the fourth pressure plate.

7. The hydraulic twin clutch according to claim 6, further comprising:

a first contact-pressure ring radially surrounding the first cylinder;

a first seal sealing a space located radially between the first contact-pressure pring and fist cylinder and permitting movement of the first contact-pressure ring relative to the first cylinder; and a compensating corer carried on the contact-pressure ring, located on the opposite side of the first annular cylinder from the location of the first piston, the compensating cover, first contact-pressure ring and first cylinder forming a changer for compensating the pressure in the first piston.

8. The hydraulic twin clutch according to claim 6, further comprising:

a first contact-pressure ring radially surrounding the first cylinder; and a compensating cover carried on the contact-pressure ring located on the opposite side of the annular cylinder from the location of the first piston, the compensating cover, first contact-pressure ring and first cylinder forming a chamber for compensating the pressure in the first piston.

9. The hydraulic twin clutch according to claim 8, wherein the chamber for compensating is filled with pressurized oil from the first cylinder through a relatively small filling hole formed in the first cylinder.

10. The hydraulic twin clutch according to claim 8, wherein the chamber for compensating is filled with pressurized oil via a filling bole, independently of pressure in the first cylinder.

11. A hydraulic twin clutch for a transmission having two transmission input shafts, comprising:

first and second transmission input shafts;

a driven clutch housing;

a first clutch for releasably connecting the clutch housing to the first transmission input shaft, having first friction discs;

a first annular piston-cylinder unit, located radially outward of the first transmission shaft and radially inward from the first friction discs for hydraulically-actuating the first clutch;

a second clutch for releasably connecting the clutch housing to the second transmission input shaft, having second friction discs;

a second annular piston-cylinder unit located adjacent the first piston-cylinder unit, located adjacent the first friction discs, located radially outward of the second transmission shaft and radially inward from the second friction discs, for hydraulically-actuating the second clutch;

a clutch web fixed to the clutch housing, located between the first and second clutches and between the first and second piston-cylinder unite;

a clutch cover driveably connected to the clutch housing;

a clutch hub to which the clutch web and clutch housing are driveably connected;

wherein the first clutch further comprises a third pressure plate located at the opposite axial side of the first discs from the location of the first pressure plate, the second clutch further comprises a fourth pressure plate located at the opposite axial side of the second discs from the location of the second pressure plate;

a first annular cylinder forming a working chamber supplied with pressurized oil, driveably connected to the clutch hub;

a second annular cylinder forming a working chamber supplied with pressurized oil, driveably connected the clutch hub;

a first annular piston movably guided and sealed in the first annular cylinder, arranged between the clutch web and first cylinder, and adapted to apply force on the third pressure plate; and a second annular piston movably guided and sealed in the second annular cylinder, arranged between the clutch web and the second cylinder, and adapted to apply force on the fourth pressure plate,
- a first contact-pressure ring radially surrounding the first cylinder;
- a first seal sealing a space located radially between the first contact-pressure ring and first cylinder and permitting movement of the first contact-pressure ring relative to the first cylinder; and
- a compensating cover carried on the contact-pressure ring, located on the opposite side of the first annular cylinder from the location of the first piston, the compensating cover, first contact-pressure ring and first cylinder forming a chamber for compensating the pressure in the first piston.

12. The hydraulic twin clutch of claim 11, further comprising:
A first clutch bell driveably connecting the first transmission input shaft and first clutch,
Having a radially inner surface drievably engaged with friction discs of the first clutch; and
A second clutch bell driveably connecting the second transmission input shaft and second clutch, having a radially inner surface driveably engaged with friction discs of the second clutch.

13. The hydraulic twin clutch as claimed in claim 11, further comprising:
A first pressure plate for the first clutch and a second pressure plate for the second clutch, each pressure plate formed integrally with the clutch web.

14. The hydraulic twin clutch as claimed in claim 11, wherein
The first clutch further comprises a first set of input friction discs, a first disc carrier supporting the first set of input friction discs and formed integrally on the clutch web; and
The second clutch further comprises a second set of input friction discs, a second disc carrier supporting the second set of input friction discs and formed integrally on the clutch web.

* * * * *